Oct. 11, 1955

T. H. S. BURNS ET AL 2,720,203

APPARATUS FOR THE ADMINISTRATION
OF ANALGESICS AND ANAESTHETICS

Filed Nov. 3, 1952

INVENTORS
T. H. S. BURNS AND
J. H. BENSON
BY Stevens, Davis, Miller & Mosher
ATTORNEY Oct. 11, 1955     T. H. S. BURNS ET AL     2,720,203
APPARATUS FOR THE ADMINISTRATION
OF ANALGESICS AND ANAESTHETICS Filed Nov. 3, 1952     4 Sheets-Sheet 2

INVENTORS
T. H. S. BURNS AND
J. H. BENSON

BY Stevens, Davis, Miller+Mosher
ATTORNEY

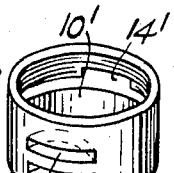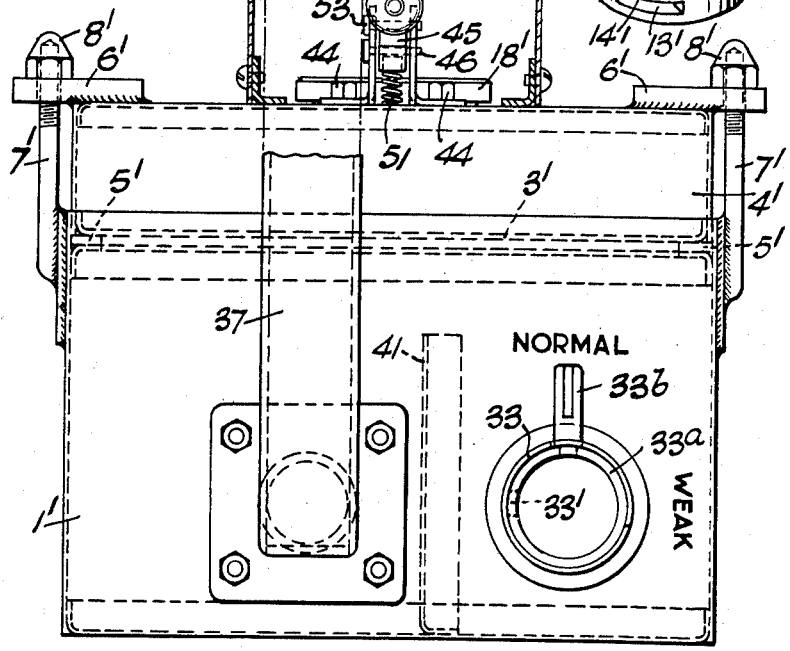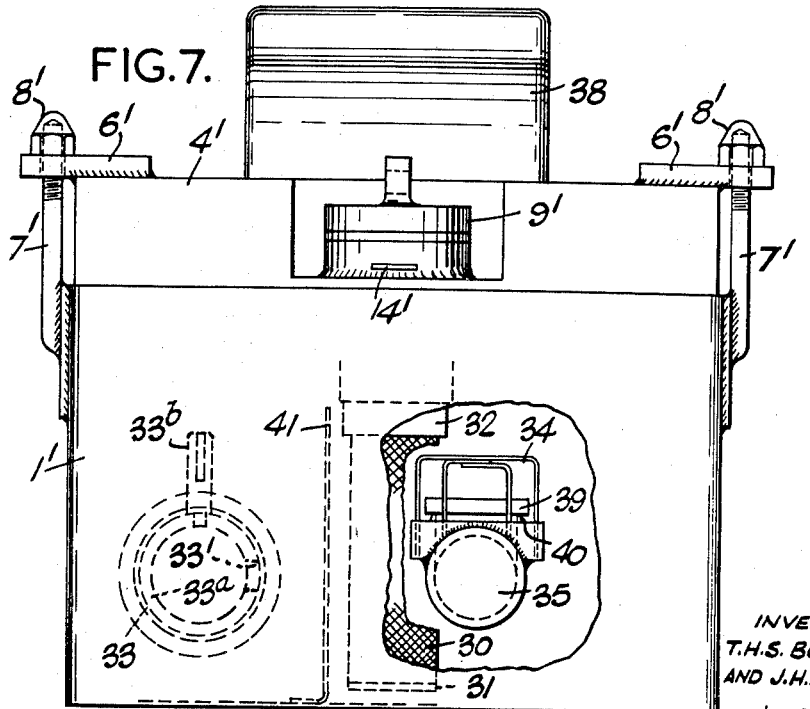

Oct. 11, 1955

T. H. S. BURNS ET AL
APPARATUS FOR THE ADMINISTRATION
OF ANALGESICS AND ANAESTHETICS 2,720,203

Filed Nov. 3, 1952

INVENTORS
T. H. S. BURNS AND
J. H. BENSON
BY Stevens, Davis, Miller, +
Mosher ATTORNEY

United States Patent Office 2,720,203
Patented Oct. 11, 1955

2,720,203

APPARATUS FOR THE ADMINISTRATION OF ANALGESICS AND ANAESTHETICS

Thomas Henry Stewart Burns, London, and John Herbert Benson, Kent, England, assignors to National Research Development Corporation, London, England, a British corporation Application November 3, 1952, Serial No. 318,401

Claims priority, application Great Britain November 13, 1951

13 Claims. (Cl. 128—188)

This invention relates to medical apparatus for administering analgesics of a kind which is hereinafter referred to as an "inhaler." By the term "inhaler" is meant an apparatus from which a patient draws a required mixture of gas and an analgesic by inhalation through a face mask and a conduit attached to the apparatus and mask. More particularly, but not exclusively, the invention relates to an inhaler which is especially adapted for the administration of purified trichloroethylene. Trichloroethylene is an especially favoured analgesic for use during childbirth and a suitable purified form of this compound is sold as a liquid which boils at 78° C. Throughout this specification, the use of the term "analgesic" is to be understood to include also anaesthetising substances and the use of the term "gas" to include air or a mixture of air and another gas or gases.

In order that the use of an analgesic may be both effective in producing a desired depth of analgesia and yet may not be dangerous, it is generally necessary for it to be administered in admixture with another gas or gases and for its concentration in such gas or gases not to exceed a fixed percentage of the mixture. This latter condition must obtain in the case of trichloroethylene and the inhaler used must be capable of delivering a mixture having a composition which is substantially constant irrespective of atmospheric temperature conditions and the inspiration rate of the patient. When trichloroethylene is used for producing analgesia in childbirth or in dentistry, air is generally used as the diluting medium and the optimum percentage of trichloroethylene in a trichloroethylene-air mixture has been found to be 0.5% and in any case the trichloroethylene concentration should not be above 0.6% and generally should not fall below 0.4% of the mixture. A greater concentration than 0.6% may be dangerous since it may produce an unco-operative reaction in a patient. A concentration below 0.4%, say below 7 litres/minute, may be advantageous when the breathing of a patient becomes weak, and the inhaler may then permit the concentration to fall below 0.4%.

The main object of the present invention is to provide an improved inhaler in which the above requirements are fulfilled and which is moreover safe and simple in operation.

It may happen that an abnormal depth of inspiration on the part of the patient, even where a gas capacity is provided, may cause an undesirable increase in the amount of the analgesic mixed with the gas and, hence, according to a further feature of the invention, means may be provided for introducing an additional volume of gas into the gas capacity when the depth of inspiration exceeds a predetermined limit. This means may conveniently comprise a simple lift valve which is located in the gas capacity and which can establish communication between the capacity and the atmosphere external thereto.

In order that the invention may be more readily understood embodiments thereof will now be illustrated, by way of example, with reference to the accompanying drawings in which are shown portable inhalers particularly designed for the administration of a trichloroethylene-air mixture. Referring to the drawings:

Figure 6 is an elevation in the direction of the arrow B in Fig. 4;

Figure 7 is an elevation, part broken away, in the direction of arrow C in Fig. 4;

Figure 8 is a perspective view of a detail of the inhaler shown in Fig. 4;

Figure 1:
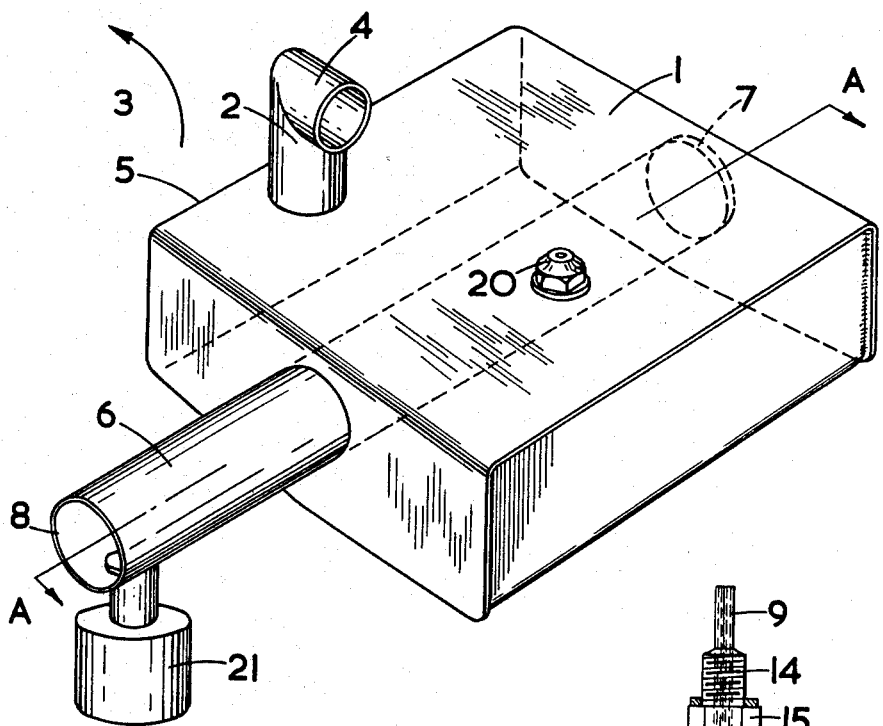
Figure 1 is a perspective view of one form of inhaler according to the invention.
Figure 3:
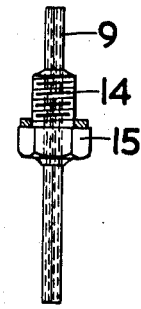
Figure 3 shows an elevational view of a detail.
Figure 2:
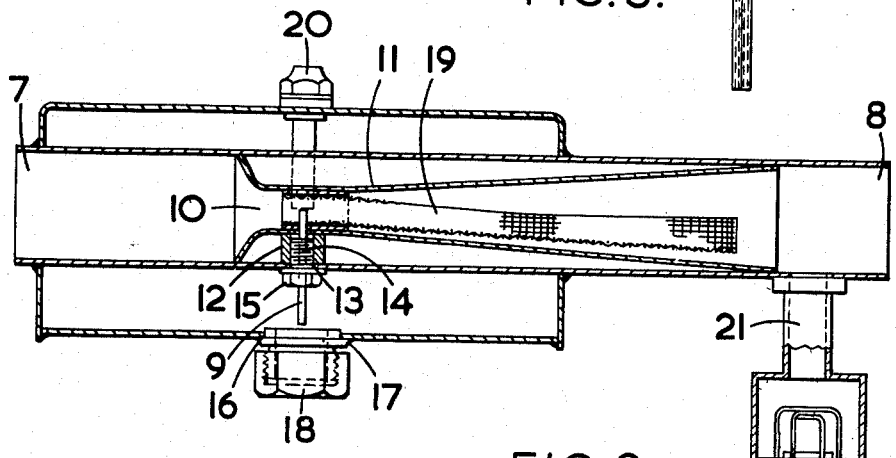
Figure 2 is a longitudinal section along the line A—A of Fig. 1.

Referring to Figs. 1 to 3, the inhaler comprises a container 1 fitted with a filling aperture 2, and in order to fill the apparatus with trichloroethylene it is tilted in the direction of the arrow 3 (Fig. 1) so that the part 4 of the aperture is vertical. The distance of the aperture 2 from the edge 5 of the container is such that after filling nearly to the point where trichloroethylene overflows from out of the mouth of the part 4, the depth of trichloroethylene in the container when it is returned to the normal horizontal operative position is ½ inch. A closure (not shown) is provided for the part 4 of aperture 2 and may conveniently take the form of a screw cap. A hollow tube 6 extends through and is sealed into the container in the position shown and the end 7 is open to the atmosphere; the end 8 is adapted for the attachment thereto of a conduit (not shown) which leads to an inhalation mask (not shown).

In order to secure the required percentage of trichloroethylene in air, i. e. between 0.4 and 0.6 per cent., it is necessary for approximately 0.02 cc. of trichloroethylene to be vaporised in each litre of air drawn through the tube by the respiration of the patient. For this condition to be achieved, there is provided a jet 9 which establishes communication between the trichloroethylene in the container and the tube 6 and it is arranged that the top of the jet projects into the throat 10 of a venturi tube 11 within the tube 6 as shown in Figure 2. The jet 9 conveniently consists of two 22 S. W. G. stainless steel hypodermic needles, for example, and the fineness of the bore causes the jet to exert a capillary action upon the trichloroethylene so that there is always trichloroethylene at the top of the jet so long as any remains in the container. An internally threaded boss 12 is provided on the throat of the venturi tube, and aligns with a hole 13 in the tube 6. The jet 9 is soldered or otherwise secured in a hollow externally threaded sleeve 14 which screws into the boss 12 as shown. The sleeve 14 is provided with a standard nut-head 15 which abuts against the tube 6 when the jet is in position. An aperture 16 is provided in the casing 1 and externally threaded sleeve 17 is secured therein. A box-spanner may be inserted through the sleeve 17 for removing or inserting a jet. A closure cap 18 is provided for the sleeve 17. A length of fine wire gauze 19, which in the embodiment shown is of triple warp Phosphor bronze, extends from over the jet to near the outlet of the venturi tube 11 as shown in Figure 2 and is curved into an arc of a circle extending round the lower part of the inner circumference of the venturi. The dimensions of the venturi tube and of the jet are so chosen that for each litre of air drawn through the tube 0.02 cc. of trichloroethylene are vaporised and the purpose of the capillary jet and of the gauze is to ensure that this vaporisation takes place irrespective of the surrounding temperature.

An airleak 20 is provided so that atmospheric pressure exists in the container. When air is drawn through the throat 10 of the venturi tube 11, a negative pressure is established across the top of the jet 9, and the difference between this negative pressure and the atmospheric pressure in the container serves to force trichloroethylene up and out of the jet 9. The dimensions of the throat 10 and of the jet 9 are such that a desired proportion of trichloroethylene is maintained in the air stream passing through the venturi tube 11 and tube 6.

It may happen that vigorous respiration on the part of the patient may tend to cause an undesirable increase in the amount of trichloroethylene admixed with the air owing to an increase in the negative pressure across the top of the jet. According to a feature of the invention, therefore, means are provided to introduce an additional volume of air into the air stream so as to offset this tendency. Such means may take the form of a valve 21 located near the end of the tube 8 as shown in Fig. 2. This valve is of the captive disc gravity control type and is adjusted to ensure that the valve lifts and causes an additional intake of air into the mixture passing through the tube 6, should the patient's respiration be such that an undesirable concentration of trichloroethylene would be present but for the presence of this valve. In an example, the apparatus is arranged to deliver 0.4% trichloroethylene in air (volume/volume) at a tidal volume of 250 cc. Below this tidal volume, the mixture will be less than 0.4%. When the pressure in the venturi is such that the mixture is almost 0.6% the valve 21 is arranged to open and allow an additional volume of air into the air stream, thus preventing the mixture from becoming richer than 0.6%.

In order to avoid accidental blockage of the inlet of air to the tube at the end 7, which might have the result of causing pure or nearly pure trichloroethylene to be inhaled, the container 1 may be enclosed in an outer perforated cage, which cage may extend beyond and over the end 7. Alternatively, a perforated guard cage may be provided only on the end of the container adjacent the end 7 in which case the disc entry for the disc valve 21 would be within the guard cage.

The inhaler may be provided with a clamp secured to the container to enable it to be fixed on a bed-head or other convenient support. Alternatively, the container may be fitted with a threaded boss which may be used to attach the inhaler to a telescopic tripod stand.

When this inhaler is used for trichloroethylene administration, it is necessary that the tube 6 and the venturi tube 11 are of lead, brass, stainless steel or other material not reactive with a trichloroethylene-air-mixture.

Referring to Figs. 4 to 8, the inhaler comprises an open-ended container 1' having an internal peripheral shoulder 2' upon which seats the bottom 3' of a second container 4'. The bottom of the container 4' is separated from the shoulder 2' by a sealing washer 5'. Two lugs 6' (Figures 5, 6 and 7) are provided on opposite ends of the upper wall of container 4' and have holes through each of which projects the threaded head of a bolt 7' the lower end of which is secured to the side wall of the container 1. Nuts 8' screw on the heads of the bolts 7' and by exerting pressure on the lugs 6' maintain the containers in sealing engagement. Container 4' serves as the trichloroethylene container which is filled through the filling device 9' which is located at one side of container 4' as shown. The device 9' comprises a wide-mouthed filling chamber 10' closed by closure cap 11'. The base of the filling chamber 10' is solid except for an orifice 12' which communicates directly with a sector shaped slot 13' (as shown in Figure 8) from which trichloroethylene spills over into container 4'. Overflow orifices 14' (Figure 8) are provided at a level corresponding to that level to which the container is to be filled with trichloroethylene. When it is desired to fill container 4 trichloroethylene is poured into the filling chamber and when the trichloroethylene has reached the required level in the container, overflow will occur from orifice 14'. The position of the orifice 12' and the disposition of the bottom of the filling chamber 10' on the bottom 3' of container 4', effectively prevents any possibility of overfilling the container should tilting take place during the filling operation. Thus, if the container is tilted so that trichloroethylene in chamber 10' tends to flow away from orifice 12' then overflow takes place from orifice 14' and none can pass through orifice 12' into the container. If, on the other hand, the container is tilted in the opposite direction overflow occurs from the container into the chamber 10' and thence from the chamber.

A tube 15', having its upper end externally threaded, extends from the top of and through container 4' into container 1'. Part way along its length the tube is provided with a shoulder 16' which bears on the bottom 3' through the medium of sealing washer 17'. A nut 18' screws on the threaded part and engages the top of container 4' through the medium of sealing washer 19'; upon screwing the nut tight the holes through which the tube extends are effectively sealed from communication with the interior of the containers. In the container 4' an annular baffle 20' is provided surrounding and spaced from the tube 15'. The baffle 20' is provided with apertures 21' in its lower marginal portion which communicate both with the container 4' and space 22 surrounding the tube. An air vent 23 communicates with space 22 through passage 24 and serves to ensure that the pressure on the trichloroethylene in space 2 is atmospheric.

In order to secure the required percentage of trichloroethylene in air, i. e. between 0.4 and 0.6 per cent. (volume/volume) it is necessary for approximately 0.02 cc. of the liquid trichloroethylene to be vapourised in each litre of air inspired by the patient. For this condition to be achieved there is provided a horizontal duct 25 in the wall of tube 15' which establishes communication between the bore of the tube, and, via vertical duct 26 and annular groove 27, the space 22 into which trichloroethylene can flow via apertures 21'. The terminal part 28 of duct 25 is of narrow bore, for a purpose to be later explained, and opens into the bore of the tube 15' just above the throat 29 thereof which is formed as a Venturi tube. Over the lower end of the tube 15' is fitted a cylinder 30 of fine wire gauze, which, in the embodiment shown, is of triple-warp Phosphor bronze. The gauze cylinder 30 is closed by a solid cap 31 and a split ring 32 is provided to hold the gauze on the end of the tube 15'. The container 1' is provided with an outlet tube 33 to which may be attached a conduit leading to an inhalation mask (not shown). The outlet 33 is provided with a through hole (not shown in Fig. 6) which can be uncovered or covered by a tube 33a fitting firmly with the outlet. This tube 33a has a through hole (33$^1$) which in assembled position has its vertical axis in the same transverse plane as the axis of the hole in outlet 33. The tube 33a has a lever 33b projecting through a slot 33c in outlet 33 and by rotating this lever, for example from the "normal" to the "peak" position as shown in Figure 6, the hole in outlet 33 may be partially uncovered i. e. partially aligned with the hole in tube 33a, so as to admit some air through the holes to dilute the mixture being inhaled by the patient. In the "normal" position of lever 33b the hole in outlet 33 is covered by the tube 33a so that additional air is not admitted to the inhalation mixture flowing through outlet 33 on its way to the patient's inhalation mask. A simple disc type of lift valve 34 is provided in a tube 35 which is closed at its end 36 and at its other end passes through the side wall of the container 1' and is connected to a vertical open ended tube 37 which terminates under shroud 38 to be later described. In order to prevent sticking of the disc 39 of the left valve 34 a knife edge seating 40 may be provided. When air is drawn through the tube 15' upon inspiration of the patient through outlet 33, a negative pressure is established in the container 1', and hence across the end 28 of the duct 25, and the difference between this negative pressure and the atmospheric pressure in the trichloroethylene container 4' serves to draw trichloroethylene up duct 26 and out of duct 25. The dimensions of the Venturi and of the part 28 of the duct are so chosen that for each litre of air drawn through the tube 0.02 cc. of trichloroethylene is drawn into the air stream whereupon vaporisation takes place substantially irrespective of the surrounding temperature. Should inspiration of the patient become greater than a predetermined limit the disc valve 34 will lift and an additional volume of diluent air will be drawn into the container 1'. A baffle plate 41 is provided between the tube carrying the valve 34 and the outlet 33 in order to prevent air passing directly therebetween and not being mixed with the contents of the container 1'. The shroud cage 38 is secured to the top of the container 4' and projects as shown beyond the edge of container 4', and air inlet being provided at 42. This shroud covers the entry to tube 15', the air vent 23 and the outlet of tube 37 and thus prevents any possibility of blocking air supply to the inhaler when in normal operative position.

Figure 4:
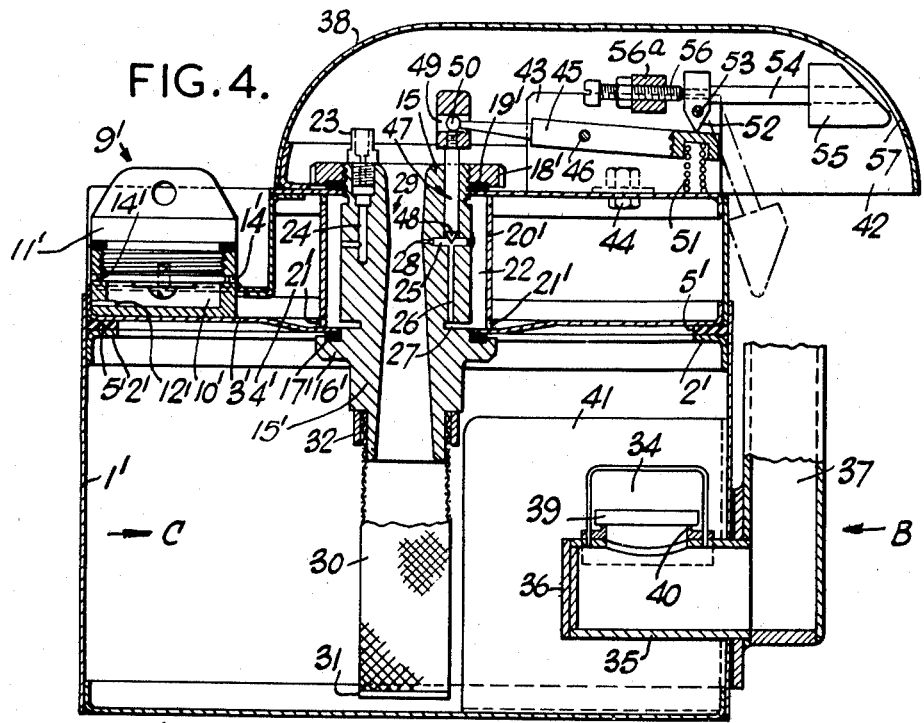
Figure 4 is a cross-sectional view of another form of inhaler on the line A—A of Fig. 5.
Figure 5:
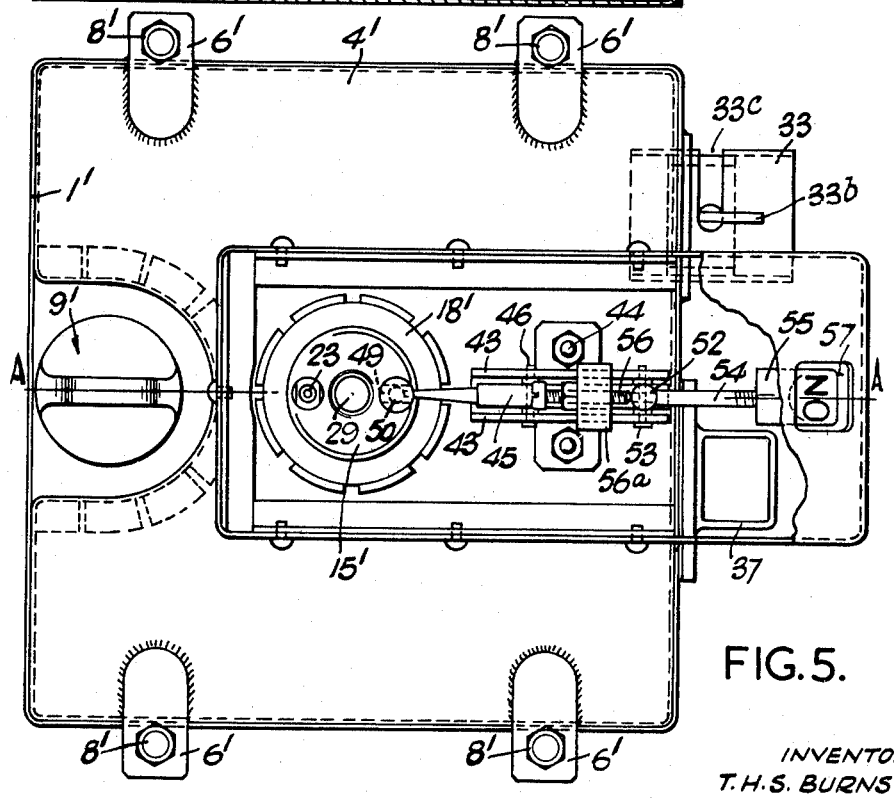
Figure 5 is a top plan view of the inhaler shown in Fig. 4.

It is essential to prevent the possibility of trichloroethylene flowing by gravity into the tube 15' from ducts 25 and 26 in the event of the inhaler being tilted on its side or turned upside down. It is also necessary to provide against the possibility of shaking trichloroethylene out of the ducts 25 and 26. Accordingly, positive means of preventing this contingency are provided. A pair of vertical brackets 43 are secured to the top of container 4' by the nuts and bolts 44 and a lever arm 45 is pivoted to these brackets at 46. A thin rod 47 is vertically slidable in a bore through the wall of tube 15', the axis of which bore is aligned with the axis of duct 26. The end of the rod is formed conically at 48 and is capable of seating in the mouth of the duct 26 to obturate it and prevent the passage of trichloroethylene to the bore of the tube 15'. The other end of the rod is provided with a seating 49 for a ball pivot 50 carried on the end of arm 45. A spring 51, located as shown in Figs. 4 and 6, serves to urge the arm 45 in a direction to close the duct 26. A knife edge element 52 is pivoted at 53 to brackets 43 and carries an arm 54 having a weight 55 on the end thereof. On the opposite side of element 52 is an adjustable screw 56 carried in element 56a secured to brackets 43. By adjustment of this screw the sensitivity of action of arm 54 may be controlled. In the full line position of the weight 55 as shown, the element 52 engages the end of arm 45 above spring 51 and presses the end downwardly against the spring bias to maintain duct 26 open. The screw 56 is adjusted so that such a condition ceases to exist if the inhaler is handled at all roughly. Any shaking of the container causes the weight 55 to move to or towards the dotted line position (shown in Figure 4) thus moving element 52 out of engagement with arm 45, upon which the bias of the spring causes the arm 45 to move to the position in which it fully closes the duct 26. The guard cage 38 is provided with a window 57 through which the part 58 of weight 55 can be observed. The part 58 carries the word "on" (Figure 5) to provide a visual indication of the full-line position of weight 55 which in turn is an indication that the inhaler is in operative position.

As in the case of the inhaler of Fig. 1, the inhaler of Fig. 4 may also be provided with a clamp fixed to the container 1' to enable it to be attached to a bed-head or other available support in cases where there is no convenient support on which it may stand substantially vertical. Alternatively the container may be fitted with a threaded boss which may be used to attach the inhaler to a telescopic tripod stand. Further, as in the case of the inhaler of Fig. 1 it is necessary that the tube 15' should be of lead, brass, stainless steel or other substance not reactive with trichloroethylene-air mixture. The containers may be constructed of tin plate, aluminium or other material not deleteriously affected by trichloroethylene.

Figure 9:
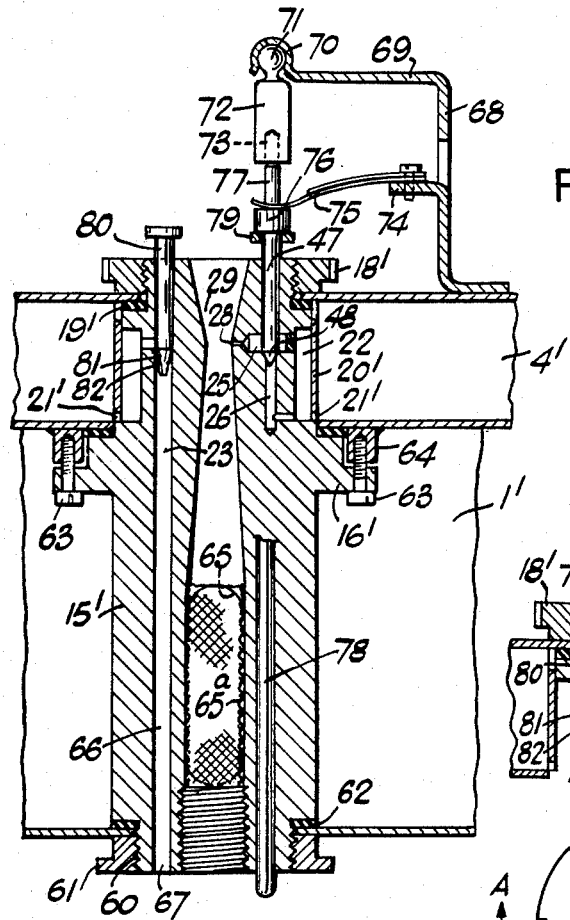
Figure 9 is a sectional elevation showing a modification of part of the inhaler shown in Fig. 4.
Figure 10:
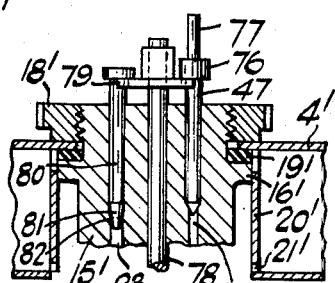
Figure 10 is a longitudinal section on the line A—A of Fig. 11.
Figure 11:
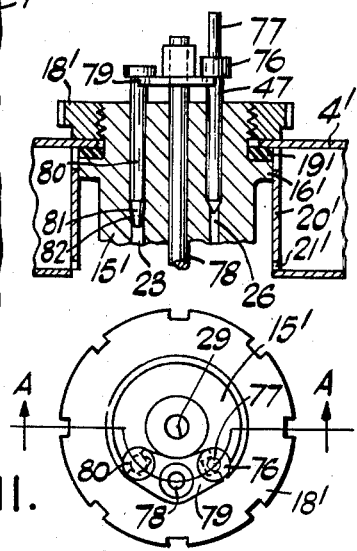
Figure 11 is a plan view of part of Fig. 9 in the direction of the arrow E.

Figs. 9–11 show a modification of part of the apparatus shown in Fig. 4 and like reference numerals are applied to parts which are similar to those in the earlier figure. As shown, the tube 15' extends right through container 1' and is externally threaded at the end 60. The nut 61 screws on to the said threaded end and on being tightened serves to pull container 4' into contact with the washer 5' on shoulder 2' of the container 1' (not shown in Figure 9). A washer 62 is positioned as shown in Fig. 9. This arrangement eliminates the necessity for providing the lugs 6', bolts 7' and nuts 8' as in the embodiment shown in Fig. 4. The shoulder 16' is extended and is drilled to receive bolts 63 which engage in a flange 64 of container 4'.

The lower end of tube 15' is provided with a through slot 65 which is covered on both sides with fine wire gauze 65a which, as in the embodiment of Fig. 4, is of triple-warp phosphor-bronze.

The air vent 23 is extended as a narrow bore tube 66 and this tube 66 passes right through the body of tube 15' and communicates with the exterior of the inhaler at 67. Thus should the inhaler be shaken any trichloroethylene which may find its way into duct 23 will flow down tube 66 and out of the inhaler at 67.

In order to prevent the possibility of trichloroethylene flowing by gravity into the tube 15' from ducts 25, 26 in the event of the inhaler being tilted on its side or turned upside down, and also to provide against the possibility of shaking trichloroethylene out of the ducts 25 and 26, a modification of the means shown in Fig. 4 is provided for preventing this contingency. A vertical bracket 68 is secured to the top of the container 4' in any convenient manner and extends upwardly for a short distance and is then bent over to form the arm 69 a shown in Fig. 9. The arm 69 terminates in a cup formation 70 which embraces the ball head 71 of a blunt ended weighted bolt 72 which has formed in the end thereof a hole 73. The bracket 68 is also provided with a projecting lug 74 to which is attached a leaf spring 75. The top of rod 47 is provided with a head 76 upon which the end of the leaf spring bears in a manner to press the rod 47 home so as to close duct 26. The head 76 is provided with a rod-like extension 77 the purpose of which will be later described. A rod 78 projects below the bottom of the container and slidably fits within, and extends through, a bore in the tube 15' and is provided at its head with a split collar 79. The collar 79 embraces the rod 47 just beneath the head 76. Upon the container being placed vertically upright on a flat surface the rod 78 is pushed upwardly against the pressure of the leaf spring 75 and hence serves to raise the rod 47 so as to open duct 26. In order to prevent the possibility of duct 26 being open when the inhaler is not on a flat surface the weighted bolt 72 is provided and if the inhaler is tilted this bolt will swing so as to bring the hole 73 out of alignment with rod 77 which is capable of fitting therein. Thus when the inhaler is tilted upon rod 78 being pressed upwardly the extension 77 fouls the bolt 72 and the rod 47 cannot be lifted so as to open duct 26.

The rod 78 may also have a collar extending so as to engage beenath the head of a rod 80 which is slidable within the vent 23 and is provided with a conical end 81 to engage a conically formed seating 82 in the vent 23. Thus when the inhaler is not vertically upright on a flat surface both the air vent and the duct 26 are positively blocked. The arrangement of the rod 78, the collar 79 and the rods 47 and 80 will be readily apparent from Figs. 10 and 11.

Figure 12:
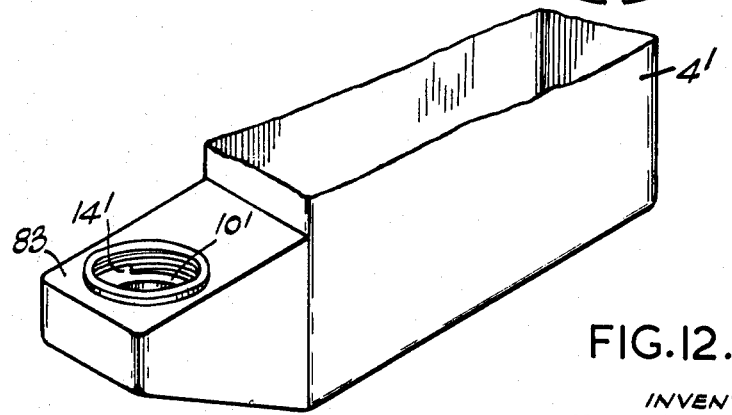
Figure 12 is a perspective view of part of the inhaler of Fig. 4 to show a modified position of the filling arrangements.

Fig. 12 shows a further modification of the embodiment shown in Fig. 4. In Fig. 4 the rise of trichloroethylene in container 4' has only to be approximately 1/32" before a condition of overflow is shown within the filling chamber 10'. However, if the container is slightly tilted while filling is in progress a condition of being filled to the required capacity may be indicated by flooding of the chamber 10' before in fact a sufficient quantity of trichloroethylene has been supplied to the container 4'. In the modification shown in Fig. 12 the container 4' is provided at its side with an extension 83 which communicates with the container 4' and in which chamber 10' is located as shown in the Figure. In order to fill the container it is thus necessary to turn the inhaler on its side. It will be clear that the 1/4" depth of liquid in the vertical position of the inhaler becomes perhaps as much as a 2" depth in the container 4' when this is on its side. Consequently even if the container 4' is tilted during filling and thus the filling chamber 10' floods before the required quantity of trichloroethylene is in the container, the error between the required amount and the amount indicated in the tilted position is very much less than in the case of the embodiment shown in Fig. 4.

We claim:

1. An inhaler for delivering to a patient a mixture derived from a normally liquid analgesic and an oxygen-containing gas, said inhaler having a conduit system through which the patient draws in the mixture, an inhalation-mask connection at one end of the conduit system, an oxygen-containing gas admission means at the other end of the conduit system, gas-passage constriction means within the conduit system, a normally liquid analgesic reservoir with filling means, a duct leading out of the reservoir from a point normally below the analgesic-liquid level and leading into the conduit system at the said gas-passage constriction and having at least at its conduit-system end a small cross-section effective to restrict the rate of liquid analgesic outflow, a pressure-equalization gas inlet in the reservoir wall, and a non-return valve associated with the conduit-system at a point between the said gas-passage constriction and the mask-connection and operative such that it will admit into the conduit system additional analgesic-diluting oxygen-containing gas in the event that the gas pressure within the conduit system in the vicinity of the valve falls below a predetermined value.

2. An inhaler as claimed in claim 1, in which the principal member of the conduit system is a tube that extends through the analgesic reservoir.

3. An inhaler as claimed in claim 2, in which analgesic reservoir filling means are provided including a bent filling neck leading beyond that wall of the reservoir which is uppermost when the inhaler is in position for use, and in which the general plane of the outer opening of the filling neck is at least approximately vertical when the inhaler is in position for use and lies, when the inhaler is turned onto one side into a position convenient for filling, at a level that allows of the pouring in of no more than that volume of liquid analgesic which, when the inhaler is returned to its normal position of use, will reach to the highest level in the reservoir that is safe.

4. An inhaler as claimed in claim 1, having a gas capacity of the order of magnitude of two liters in communication with the conduit system at a point between the said gas-passage constriction and the mask-connection, this gas capacity being provided by a container constituted by one of the sections of a partitioned vessel of which a section constitutes the liquid analgesic reservoir.

5. An inhaler as claimed in claim 4, in which the liquid analgesic-conveying duct is provided with a slidably-mounted blocking-pin, resilient means being associated with the blocking-pin and tending to slide it into its blocking position, the resilient means further acting against a weight-carrying member pivoted on a horizontal axis and normally effective to support the weight carried by said member in a position higher than its lowest possible position, the resilient means being restrained from sliding the blocking-pin into its blocking position by the weight-carrying member when the weight is so supported, the weight being normally set in a position from which, in the event of the inhaler being shifted unduly, it will drop into a lower position, moving its carrying member into a position in which it ceases to restrain the resilient means thereby causing the resilient means to slide the blocking-pin into its blocking position.

6. An inhaler as claimed in claim 5, in which the blocking-pin is associated with the said resilient means by a lever linked to the blocking-pin at one end and pressed at its other end by the said resilient means against the said weight-carrying member.

7. An inhaler as claimed in claim 4, in which the liquid analgesic-conveying duct is provided with a slidably-mounted blocking-pin, resilient means being associated with the blocking-pin and tending to slide it into its blocking position, said inhaler also having a member tending to protrude downwardly beyond the main inhaler structure, and unable to rise relatively to the main inhaler structure upon the inhaler being set down except when it is in an orientation proper for use, said member being associated with the blocking-pin in such manner as to effect its sliding out from its blocking position upon being caused to rise relatively to the main inhaler structure.

8. An inhaler as claimed in claim 7, in which the protrudable member is a rod slidable through the main inhaler structure in a normally vertical direction, said inhaler also having a universally-pivoted weight suspended just above the upper end of the rod, and having a cavity corresponding with the upper end of the rod and opening vertically downwardly when the weight is hanging freely, and being so mounted that it will, unless the inhaler is in an orientation proper for use, prevent the upper rod end from rising and entering said cavity, thereby blocking flow of liquid analgesic through said duct.

9. An inhaler as claimed in claim 8, in which an analgesic-reservoir pressure-equalization gas inlet is provided with a second slidably mounted blocking-pin tending to rest in its blocking position, said protrudable rod member being associated with this second blocking-pin in such manner as to effect its sliding out from its blocking position upon being caused to rise relatively to the main inhaler structure.

10. An inhaler as claimed in claim 9, in which the protrudable rod member is associated with the two blocking-pins by means of a plate engaged by said protrudable rod member, said plate engaging in turn a head portion provided on each of the blocking-pins.

11. An inhaler as claimed in claim 4, in which the oxygen-containing gas inlet of the conduit system is provided with a protective shroud.

12. An inhaler as claimed in claim 11, in which said shroud also protects the analgesic-reservoir pressure-equalization gas inlet.

13. An inhaler as claimed in claim 4, in which liquid analgesic-reservoir filling means are provided including an overfilling-prevention device comprising a side-filling-chamber having overflow orifices spaced around its periphery at the highest level to which the analgesic liquid may safely reach and having a passage leading from its lower part to the main liquid analgesic reservoir.

References Cited in the file of this patent

UNITED STATES PATENTS

| 5,365 | Morton | Nov. 13, 1847 |

FOREIGN PATENTS

| 636,854 | Great Britain | May 10, 1950 |